United States Patent [19]

Zecher et al.

[11] Patent Number: 4,624,981

[45] Date of Patent: * Nov. 25, 1986

[54] PROCESS FOR THE PRODUCTION OF POLYAMIDEIMIDES FROM POLYISOCYANATES, POLYCARBOXYLIC ACID ANHYDRIDES AND LACTAMS OR POLYAMIDES IN WHICH THE REACTION PRODUCTS ARE PRECIPITATED WITH A NON-SOLVENT

[75] Inventors: Wilfried Zecher, Leverkusen; Rolf Dhein, Krefeld; Klaus Reinking, Wermelskirchen, all of Fed. Rep. of Germany

[73] Assignee: Bayer Aktiengesellschaft, Leverkusen

[*] Notice: The portion of the term of this patent subsequent to Oct. 8, 2002 has been disclaimed.

[21] Appl. No.: 746,714

[22] Filed: Jun. 20, 1985

Related U.S. Application Data

[63] Continuation-in-part of Ser. No. 644,709, Aug. 27, 1984, Pat. No. 4,546,138.

[30] Foreign Application Priority Data

Sep. 6, 1983 [DE] Fed. Rep. of Germany ....... 3332030

[51] Int. Cl.$^4$ ............................................. C08L 79/08
[52] U.S. Cl. ................................... 524/326; 264/204; 524/344; 524/345; 524/351; 524/352; 524/736; 524/739; 524/741; 525/424; 528/48; 528/73
[58] Field of Search ............... 524/326, 344, 345, 351, 524/352, 736, 739, 741; 264/204; 525/424; 528/48, 73

[56] References Cited

U.S. PATENT DOCUMENTS

| | | | |
|---|---|---|---|
| 3,658,773 | 4/1972 | Zecher et al. | 528/48 |
| 3,752,791 | 8/1973 | Zecher et al. | 524/742 |
| 4,549,006 | 10/1985 | Zecher et al. | 528/73 |

*Primary Examiner*—Maurice J. Welsh
*Attorney, Agent, or Firm*—Connolly and Hutz

[57] ABSTRACT

This invention relates to a new process for the production of polyamide imides.

8 Claims, No Drawings

PROCESS FOR THE PRODUCTION OF POLYAMIDEIMIDES FROM POLYISOCYANATES, POLYCARBOXYLIC ACID ANHYDRIDES AND LACTAMS OR POLYAMIDES IN WHICH THE REACTION PRODUCTS ARE PRECIPITATED WITH A NON-SOLVENT

This application is a continuation-in-part of U.S. Ser. No. 644 709 filed Aug. 27, 1984 now U.S. Pat. No. 4,546,138.

This invention relates to a new process for the production of polyamide imides.

It is known that aliphatic-aromatic polyamide imides are obtained by reacting polyisocyanates with cyclic polycarboxylic acid anhydrides and lactams (DAS No. 1,770,202) or with polyamides (DAS No. 1,956,512). The reaction products are distinguished by high softening temperatures and good elasticity values, and they are used as coatings which are resistant to elevated temperatures, for example in the lacquer sector for electrical insulation.

It has now been found that thermoplastic polymers which have outstanding properties are obtained from the condensation of organic polyisocyanates, such as aliphatic, aliphatic-aromatic and aromatic diisocyanates, with cyclic polycarboxylic acid anhydrides and lactams or polyamides at a temperature of from 0° to 400° C., and optionally in a solvent, in that the condensation or working-up operation is carried out in the presence of from 0.2 to 15% by weight, preferably from 2 to 6% by weight, based on the total weight of the reactants, of a phenol which is mono- or poly-substituted with alkyl radicals having from 1 to 20 carbon atoms and/or with cycloalkyl radicals and/or with aryl radicals having from 6 to 12 carbon atoms, and when there are only alkyl substituents present, they have in all at least 2 carbon atoms.

It has also been found that these polymers may be produced, for example in solvents, and may then be concentrated in an evaporation extruder at a temperature of from 250° to 400° C., optionally under vacuum.

The polyamide imides of this invention are, for example, thermoplastic and are distinguished by good mechanical values, such as impact strength, tensile strength, E-moduli and dimensional stability under heat. It is surprising that they may be processed thermoplastically at the elevated temperatures which are necessary for extruding and injection moulding polyimides.

In general, where imides are concerned for this area of use only particularly thermally stable radicals, for example 4,4'-substituted diphenyl ethers, may be used as the amino component. Therefore, it is surprising that the polymers according to this invention do not become brittle and infusible under these conditions. This is particularly so when they are concentrated in an extruder, as may be observed in the case of reaction products of polyisocyanates and cyclic polycarboxylic acid anhydrides.

Polyisocyanates of the type described in, for example DE-OS No. 1,770,202, may preferably be used in the present process.

The following are particularly preferred: phosgenated condensates of aniline and formaldehyde having polyphenylene-methylene structures, commercial mixtures of tolyulene diisocyanates, m-phenylenediisocyanate and the symmetrical compounds, 4,4'-diisocyanato-diphenyl methane, 4,4'-diisocyanatodiphenyl ether, naphthylene-(1,5)-diisocyanate, p-phenylenediisocyanate, 4,4'-diisocyanatodiphenyl-dimethyl methane, analogous hydro-aromatic diisocyanates, such as 4,4'-diisocyanatodicyclohexyl methane, and aliphatic diisocyanates having from 2 to 12 carbon atoms, such as hexamethylene diisocyanate, isophorone diisocyanates and mixtures thereof.

Instead of isocyanates, compounds which react as isocyanates under the reaction conditions may also be used, preferably the addition compounds of phenols and lactams, for example of phenol, commercial cresol mixtures and caprolactam, or of mixtures of the amines corresponding to the isocyanates, and aliphatic and aromatic carbonic esters, for example carbonic acid diethyl ester, carbonic acid diphenyl ester and ethylene carbonate, which may also already be partially reacted together, or polycarbodiimides and isocyanatoisocyanurates of the above-described polyisocyanates.

Monofunctional isocyanates may also be used to regulate the molecular weight, for example phenyl isocyanate, tolyl isocyanate, cyclohexyl isocyanate, stearyl isocyanate, ω,ω,ω-trifluoroethyl isocyanate and 3,5-trifluoromethylphenyl isocyanate or the corresponding amines.

Compounds which are described in DE-OS No. 1,770,202 and DE-OS No. 2,542,706, preferably polycarboxylic acid anhydrides corresponding to the following general formula (I) may e used as cyclic polycarboxylic acid anhydrides according to the present invention:

wherein
$R^1$ represents an optionally substituted $C_2$–$C_{20}$ aliphatic radical, a $C_5$–$C_{10}$ cycloaliphatic radical, an aliphatic-aromatic radical having from 1 to 10 carbon atoms in the aliphatic part and from 6 to 10 carbon atoms in the aromatic part or an aromatic radical having from 6 to 10 carbon atoms which, in addition to the cyclic anhydride group, carries at least one other cyclic anhydride group or a carboxylic group.

The following are mentioned as examples: butane tetracarboxylic acid dianhydride, cyclopentane tetracarboxylic acid dianhydride, pyromellitic acid dianhydride, benzophenone tetracarboxylic acid dianhydride and, more preferably, trimellitic acid anhydride.

Instead of carboxylic acid anhydrides, derivatives thereof may be used, such as the alkyl or phenyl esters or the polycarboxylic acids themselves which are converted into the acid anhydrides during the course of the reaction.

In order to regulate the molecular weight, carboxylic acids which react in a monofunctional manner under the reaction conditions are used, for example phthalic acid or anhydrides thereof, benzoic acid or palmitic acid which may be substituted with alkyl or halogen, such as fluorine or chlorine.

Lactams which may be used according to the present invention invention are those, for example which correspond to formula (II):

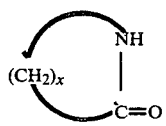

wherein

X represents an integer of from 2 to 20.

Caprolactam is preferably used.

Polyamides may be used instead of or combined with the lactams, that is, polyamides of the type described in DAS No. 1,956,512, for example polycapronamide (nylon 6), polydodecanoic acid amide and polyamides of dicarboxylic acids, for example adipic acid, sebacic acid, oxalic acid, dibutylmalonic acid, isophthalic acid and terephthalic acid, and diamines, such as ethylene diamine, hexamethylene diamine, decamethylene diamines and m- and p-phenylene diamine. Polycapronamide (nylon 6) and polyhexamethylene adipamide (nylon 66) are preferably used.

Phenols which may be used according to the present invention may be represented by formula (III)

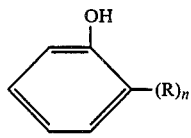

wherein

R represents $C_1$–$C_{20}$-alkyl, cycloalkyl or $C_6$–$C_{12}$-aryl, and when there are only alkyl constituents present, they must have a total of at least two carbon atoms, and n represents the numbers 1,2,3,4 or 5 and when $n > 1$, the radicals may also be different from one another.

The phenols of this invention are substituted by one or more aryl radicals having from 6 to 12 carbon atoms and/or alkyl radicals from 1 to 20 carbon atoms, and when there are only alkyl substituents present, they must have a total of at least two carbon atoms and/or by cycloalkyl radicals which may be further substituted, for example by halogen, such as fluorine or chlorine, or hydroxyl, for example 2-, 3- or 4-phenylphenol, 4-[phenyl-isopropyl]-phenol, 1- or 2-naphthol, 2,2-bis-[4-hydroxyphenyl]-propane, 2-, 3- or 4-cyclohexylphenol, n-octylphenol, 4-isopropylphenol, 2,6-di-tert.-butyl-4-methyl-phenol, hexadecylphenol and commercial mixtures of optionally branched 2-, 4-, 6-nonyl- and dodecyl-phenols. Instead of the bis-functional phenols, it is also preferably to use the lower molecular weight or high molecular weight polyesters thereof, such as the polyesters produced from hydroxybenzoic acid, isophthalic acid or terephthalic acid and 2,2'-bis-[4-hydroxyphenyl]-propane or 2,2'-bis-[hydroxy-3,5-dimethyl-phenyl]-propane and the corresponding carbonic esters.

The process of the present invention may be carried out in solvents, as described in DAS No. 1,770,202. Phenols are preferably used as solvents, such as phenol and commercial mixtures of o, m- and p-cresols.

When carrying out the present process, the reaction components are maintained at a temperature of from 0°–400° C. for a few minutes to several hours, with or without solvent. The course of the reaction may be followed, for example, by means of the evolution of gas, the increase in viscosity and the IR spectrum.

The phenols according to the present invention may be added at the beginning of the reaction, during the course thereof or only after the reaction has ended. One preferred embodiment comprises introducing the phenols of this invention in the intermediate phase before the operations of concentration and secondary condensation in an extruder. Concentration is preferably carried out such that the phenols of this invention remain in part or completely in the end product.

In a special embodiment of the invention for example during the production of the polymer in a phenolic solvent (e.g. phenol/technical cresole-mixture) after the polymerisation the reaction mixture is kept for additional 0,5 to 10 hours, preferably 1 to 6 hours at a temperature of 200° to 250° C., preferably 210° to 220° C.

These temperatures can be reached by a partial evaporation of the solvent or by applying a pressure up to about 5 bars.

It is sometimes advantageous to carry out the reaction in several stages, or to add the individual components in a different sequence or at different temperatures. Thus, the polymer may be produced in a phenolic solvent, then precipitated from the solution with a non-solvent, for example methanol, and then possibly recondensed in an extruder. A preferred embodiment comprises producing the polymer in a solvent, concentrating it, optionally already in the reactor, to produce a solution which is still capable of flowing, or to produce a molten resin, and carrying out the remaining concentration procedure, optionally with secondary condensation, in an evaporation extruder, optionally under vacuum, at a temperature of from 240° to 400° C., preferably from 280° to 340° C.

A further preferred embodiment consists in extracting the concentrated molten resin with a non-solvent, such as for example methanol or acetone. The process can be carried out by discharging the reaction mixture, which has been produced in solution, and has been partially evaporated to a solids content of 40–99% by weight, preferably 65–95% by weight, grinding the mixture after it has solidified and extracting it one or more times, optionally after further grinding, with the non-solvent in a ratio of preferably 1:1 to 1:10 and then optionally subsequently condensing the extracted resin in an extruder and compounding and granulating it.

The melt can also be spun off into the non-solvent. In this embodiment the phenols according to the invention can be added in the course of the reaction and/or introduced into the precipitated or extracted polymer during compounding.

The non-solvents both for the precipitation and the extraction are, for example, alcohols such as methanol, ethanol, n-propanol, isopropanol, n-, sec.- and tert.-butanol, isobutyl alcohol and hexanol, ketones such as acetone and isobutylmethyl ketone, chlorinated hydrocarbons such as methylene chloride and chloroform, aromatic compounds such as toluene and chlorobenzene and nitriles such as acetonitrile. Methanol and acetone are preferably used.

In general, 1 val of carboxylic acid or of cyclic carboxylic acid anhydride is reacted per val of isocyanate, and from 0.5 to 2 vals of lactam or amide are reacted per val of carboxylic acid anhydride, but substantial deviations from these proportions are also possible.

Another embodiment comprises reacting excess isocyanate with di- or tri-carboxylic acids, for example adipic acid, terephthalic acid, isophthalic acid or trimesic acid, and reacting excess carboxylic acid with polyhydric alcohols, for example ethylene glycol, neopentyl glycol, hexane diol, trimethylolpropane, trishydroxyethyl isocyanurate, trishydroxyethyl urazole and polyesters having terminal hydroxy groups.

The production of the polymers according to the present invention may be influenced by catalysts, for example by amines, such as triethylamine, 1,4-diazabicyclo-(2,2,2)-octane, N-ethyl-morpholine, N-methyl imidazole and 2-methyl imidazole, by organic and inorganic metal compounds, in particular compounds of iron, lead zinc, tin, copper, cobalt and titanium, such as iron(III)chloride, cobalt acetate, lead oxide, lead acetate, tin octoate, dibutyl tin dilaurate, copper acetylacetonate, titanium tetrabutylate, alkali metal phenolates and sodium cyanide, and by phosphorus compounds, such as trialkyl phosphine and methyl phospholine oxide.

The polyamide imides produced by the present process are suitable as thermoplasts and are distinguished by a particular tensile strength, a particular dimensional stability under heat and by particular E moduli. Their properties may be varied for the different areas of use by changing the stoichiometric ratios, the degree of condensation and by admixing low and high molecular weight components, such as fillers, pigments, anti-agers, lubricants, plasticizers and other polymers.

EXAMPLE 1

87 g of a commercial mixture of 80 parts of 2,4- and 20 parts of 2,6-toluylene diisocyanate, 1125 g of 4,4'-diisocyanatodiphenyl methane and 960 g of trimellitic acid anhydride are stirred for 2 hours at 170° C., for 2 hours at 190° C. and for 4 hours at 205° C. 1300 g of the solvent mixture are then distilled off under vacuum, and the residue is stirred for another hour at 210° C. The polyamide imide is obtained as an approximately 80% melt. The viscosity $\eta^{25}$, measured using a 15% solution in cresol, amounts to 670 mPas.

The melt is mixed with 92 g of a commercial mixture of linear and branched nonyl phenols. Upon cooling, a brittle resin is obtained which is evaporated using a Welding evaporation extruder at a maximum jacket temperature of 310° C. and under a pressure of 100 mbar, and is then condensed. The condensation product is a brown transparent resin having a relative viscosity, measured using a 1% solution in cresol at 25° C., of 2.23.

The imide resin produced in this manner is processed by injection moulding at a temperature of about 300° C. Test bodies are obtained which have an impact strength of 109 kJ/m$^2$, a tearing resistance of 100 mPa, a tensile-E-modulus of 3560 mPa and a Vicat softening temperature of 177° C.

EXAMPLE 2

4 g of 2,2-bis-[4-hydroxy-phenyl]-propane are stirred in the melt into 100 g of an 80% polyimide resin produced according to Example 1. The melt is evaporated at 310° C. under nitrogen. A transparent, fusible resin is obtained which has a relative viscosity $\eta$ of 1.85, measured using a 1% solution in cresol at 25° C.

EXAMPLE 3

100 g of an 80% polyimide resin produced according to Example 1 are melted down and mixed with 4 g of 2-phenyl-phenol. The melt is evaporated at 290° C. under nitrogen. A transparent, fusible resin is obtained having a relative viscosity $\eta$ of 1.94.

EXAMPLE 4

3 g of 4-[phenyl-isopropyl]-phenol are stirred in the melt into 100 g of an 80% polyimide resin produced according to Example 1. The melt is evaporated at 300° C. under a stream of nitrogen. A transparent, fusible resin is obtained having a relative viscosity $\eta$ of 1.97.

EXAMPLE 5

100 g of an 80% polyimide resin produced according to Example 1 are melted down and mixed with 3.2 g of β-naphthol. The melt is evaporated firstly at 250° C. and then at 300° C. under a stream of nitrogen. A transparent, fusible and elastic resin is obtained having a relative viscosity $\eta$ of 1.75.

EXAMPLE 6

4.8 g of an oligomeric polycarbonate of 2,2-bis-[4-hydroxy-phenyl]-propane having M≈735 are stirred in the melt into 100 g of an 80% polyimide resin produced according to Example 1. The melt is evaporated at 250° C. and at 300° C. under a stream of nitrogen. A transparent, fusible resin is obtained having a relative viscosity $\eta$ of 1.78 and a glass temperature Tg of 190° C.

EXAMPLE 7

100 g of an 80% polyimide resin produced according to Example 1 are melted down and mixed with 7.8 g of a polyester of terephthalic acid and 2,2-bis-[4-hydroxy-phenyl]-propane. The melt is evaporated at 310° C. under a stream of nitrogen. A transparent, fusible resin is obtained having a relative viscosity $\eta$ of 1.85.

EXAMPLE 8

6.4 g of a polycarbonate of 2,2-bis-[4-hydroxy-phenyl]-propane having a molecular weight of from 20,000 to 25,000 are stirred into 100 g of an 80% polyimide resin produced according to Example 1. The melt is evaporated at 250° C. and at 300° C. under a stream of nitrogen. A transparent fusible resin is obtained having a relative viscosity $\eta$ of 1.87.

EXAMPLE 9

33.9 g of polycapronamide (nylon 6) are dissolved in 200 g of cresol, and then 100 g of 4,4'-diisocyanatodiphenyl methane, 16.8 g of hexamethylene diisocyanate and 96 g of trimellitic acid anhydride are introduced into this solution. The reaction mixture is stirred for 2 hours at 170° C., for 4 hours at 190° C. and for 4 hours at 205° C. It is then diluted with 200 g of cresol to produce a solids content of about 33% by weight. The viscosity $\eta^{25}$ of the condensation product is 700 mPas, measuring using a 15% solution in cresol.

4 g of a commercial mixture of nonyl phenols and 1 g of 2,6-di-tert.-butyl and 4-methyl-phenol are stirred into the solution of the polyamide imide. The mixture is then evaporated under a stream of nitrogen, while the temperature is slowly increased to 300° C. A transparent, fusible resin is obtained having a relative viscosity $\eta$ of 1.97.

EXAMPLE 10

8.90 g of 4,4'-diisocyanatodiphenyl methane, 69.6 g of a mixture of 80% of 2,4- and 20% of 2,6-toluylene diisocyanate, 9.52 g of phenyl isocyanate and 768 g of trimellitic acid anhydride are introduced at 120° C. into a solution of 452 g of caprolactam in 1840 g of cresol. The condensation to produce the polyamide imide is carried out with stirring over a period of 2 hours at 170° C., 2 hours at 190° C. and 4 hours at 205° C. The mixture is then diluted with 2440 g of cresol to produce a solids content of 30% by weight. The viscosity $\eta^{25}$ of a sample of this solution which was further diluted with cresol to produce a solids content of 15% by weight, is 350 mPas.

73.5 g of a mixture of commercial dodecyl phenols are introduced into the 30% solution of the polyamide imide. The solution is evaporated using a ZSK-evaporation extruder at a maximum jacket temperature of 320° C. and under a pressure of 400 mbar. A transparent, elastic resin is obtained having a relative viscosity $\eta$ of 2.05, measured using a 1% solution in cresol at 25° C.

EXAMPLE 11

890 g of 4,4'-diisocyanatodiphenyl methane, 69.6 g of a mixture of 80% of 2,4- and 20% of 2,6-toluylene diisocyanate, 9.52 g of phenyl isocyanate and 768 g of trimellitic acid anhydride are introduced into a solution of 452 g of caprolactam and 37 g of a commercial mixture of nonyl phenols in 1840 g of cresol at 120° C. The condensation to form the polyamide imide is carried out over a period of 2 hours at 170° C., 2 hours at 190° C. and 4 hours at 205° C. Then the polyamide imide is diluted with 7.3 g of cresol to solids content of about 15% by weight. A pale brown solution of the polyamide imide with a viscosity $\eta^{25}$ of 720 mPas is obtained. The solution thus produced is stirred into excess methanol in a ratio of about 1:5. The polyamide imide is obtained in the form of a yellow powder which is separated off subsequently washed with methanol and dried. After adding 18 g of nonyl phenol the polyamide imide is then compacted in an extruder at 320° C. and then granulated. Transparent elastic test rods with a tensile modulus of 3300 mPas are obtained upon injection-moulding this material.

EXAMPLE 12

1125 g of 4,4'-diisocyanatodiphenyl methane, 87.0 g of a mixture of 80% of 2,4- and 20% of 2,6-toluylene diisocyanate, 35.9 g of N-dodecyl trimellitic acid imide and 950.4 g of trimellitic acid anhydride are introduced into a solution of 565 g of caprolactam in 1900 g of cresol/phenol (1:1) at 120° C. The condensation to form the polyamide is carried out over a period of 2 hours at 170° C., 2 hours at 190° C. and 4 hours at 205° C.

Then 1320 g of the solvent mixture are distilled off in vacuo and the residue is then stirred for 5 hours at 220° C. After cooling the polyamide imide is obtained in the form of a brittle resin with a solids content of 80% by weight. The viscosity of a 15% solution in cresol is $\eta^{25} = 880$ mPas.

12.1 A sample of the resin is ground finely and stirred into acetone, in a ratio of 1:5 for 6 hours at room temperature. Then the mixture is filtered off and the extraction with acetone is repeated under the same conditions. The polyamide imide is obtained in the form of a yellow powder which, after adding 1.5% by weight of dodecyl phenol, is compacted in an extruder and then granulated. Clear, elastic test rods with a tensile modulus of 3400 mPas are obtained upon injection-moulding at 330° C.

12.2 The extraction is carried out twice, as described, with methanol in a ratio of 1:3. A polyamide imide is obtained with a relative viscosity of 1.50. After adding 1% by weight of nonyl phenol the powder is melted into a clear elastic resin.

12.3 The extraction is carried out twice, as described, with acetonitrile, in a ratio of 1:5. The polyamide imide is obtained as a pale yellow powder with a relative viscosity, measured at 25° C. using a one-percent solution in cresol of 1.62. After adding 1% of bis-nonyl phenol, the powder can be melted at 320° C. to form a clear elastic moulding.

We claim:

1. A process for the production of polyamide imides by reacting polyisocyanates, polycarboxylic acid anhydrides and lactams or polyamides in a solvent and subsequently working up the reaction product in the presence of from 0.2 to 15% by weight of a phenol which is mono- or poly-substituted with alkyl radicals having from 1 to 20 carbon atoms and/or with cycloalkyl radicals and/or with aryl radicals having from 6 to 12 carbon atoms, and when there are only alkyl substituents present, they must have in all at least 2 carbon atoms, whereupon the polyamide imides are precipitated with a non-solvent and then granulated.

2. A process according to claim 1 wherein the polyamide imide is produced in a solvent and is then concentrated in an evaporation extruder at a temperature of from 240° to 400° C., optionally under vacuum, and is then condensed out.

3. A process according to claim 1 wherein the solvent is a phenolic solvent and after the polymerization the reaction mixture is kept for an additional time of 0.5 to 10 hours at a temperature of 200° to 250° C.

4. A process according to claim 1 wherein trimellitic acid anhydride is used as polycarboxylic acid anhydride.

5. A process for the production of polyamide imides by reacting polyisocyanates, polycarboxylic acid anhydrides and lactams or polyamides in a solvent and subsequently working up the reaction product in the presence of from 0.2 to 15% by weight of a phenol which is mono- or poly-substituted with alkyl radicals having from 1 to 20 carbon atoms and/or with cycloalkyl radicals and/or with aryl radicals having from 6 to 12 carbon atoms, and when there are only alkyl substituents present, they must have in all at least 2 carbon atoms, whereupon the polyamide imides are extracted and then granulated.

6. A process according to claim 5 wherein the polyamide is produced in a solvent and is then concentrated in an evaporation extruder at a temperature of from 240° to 400° C., optionally under vacuum, and is then condensed out.

7. A process according to claim 5 wherein the solvent is a phenolic solvent and after the polymerization the reaction mixture is kept for an additional time of 0.5 to 10 hours at a temperature of 200° to 250° C.

8. A process according to claim 5 wherein trimellitic acid anhydride is the polycarboxylic acid anhydride.

* * * * *